United States Patent
Lou et al.

(10) Patent No.: US 10,506,002 B2
(45) Date of Patent: Dec. 10, 2019

(54) PLAYBACK CONTROL DEVICE AND METHOD FOR STREAMING MEDIA CONTENT

(71) Applicant: Alcatel Lucent, Boulogne Billancourt (FR)

(72) Inventors: Zhe Lou, Antwerp (BE); Rafael Huysegems, Antwerp (BE)

(73) Assignee: Alcatel Lucent, Nozay (FR)

( * ) Notice: Subject to any disclaimer, the term of this patent is extended or adjusted under 35 U.S.C. 154(b) by 144 days.

(21) Appl. No.: 15/111,925

(22) PCT Filed: Jan. 13, 2015

(86) PCT No.: PCT/EP2015/050481
§ 371 (c)(1),
(2) Date: Jul. 15, 2016

(87) PCT Pub. No.: WO2015/110315
PCT Pub. Date: Jul. 30, 2015

(65) Prior Publication Data
US 2016/0337430 A1 Nov. 17, 2016

(30) Foreign Application Priority Data
Jan. 21, 2014 (EP) .................................... 14305079

(51) Int. Cl.
*H04L 29/06* (2006.01)
*H04L 12/24* (2006.01)
*H04L 29/08* (2006.01)

(52) U.S. Cl.
CPC ........ *H04L 65/4092* (2013.01); *H04L 41/147* (2013.01); *H04L 65/4084* (2013.01);
(Continued)

(58) Field of Classification Search
CPC .............. H04L 65/4092; H04L 41/147; H04L 65/4084; H04L 65/607; H04L 65/80; H04L 67/30; H04L 67/303; H04L 67/306
(Continued)

(56) References Cited

U.S. PATENT DOCUMENTS 8,601,153 B2 * 12/2013 Choudhury ...... H04N 21/41407
709/231
9,154,984 B1 * 10/2015 Jain ........................ H04W 24/10
(Continued)

FOREIGN PATENT DOCUMENTS

WO   WO 2010/111261 A1   9/2010
WO   WO 2011/047335 A1   4/2011

OTHER PUBLICATIONS

Haakon Riiser et al., "Video Streaming Using a Location-Based Bandwidth-Lookup Service for Bitrate Planning," ACM Transactions on Multimedia Computing, Communications and Applications, vol. 8, No. 3, Article 24, pp. 1-19, XP058007421, Jul. 2012.
(Continued)

*Primary Examiner* — Nicholas R Taylor
*Assistant Examiner* — Chong G Kim
(74) *Attorney, Agent, or Firm* — Fay Sharpe LLP

(57) ABSTRACT

A client device for controlling playback of media content that is streamed through a network to the client device, comprising: an obtaining module configured for obtaining network prediction information representing network conditions of the network predicted for a future prediction time period; and a playback control module configured for controlling playback of said content based on the network prediction information.

13 Claims, 3 Drawing Sheets

(52) U.S. Cl.
CPC .......... *H04L 65/607* (2013.01); *H04L 65/80* (2013.01); *H04L 67/30* (2013.01); *H04L 67/303* (2013.01); *H04L 67/306* (2013.01)

(58) Field of Classification Search
USPC ..................................................... 709/219
See application file for complete search history.

(56) References Cited

U.S. PATENT DOCUMENTS

| | | | | |
|---|---|---|---|---|
| 9,204,203 | B2* | 12/2015 | Brockmann | H04N 21/64753 |
| 2009/0282162 | A1* | 11/2009 | Mehrotra | H04L 65/607 709/233 |
| 2011/0093605 | A1* | 4/2011 | Choudhury | H04L 65/4084 709/231 |
| 2011/0214061 | A1* | 9/2011 | King | H04L 43/0882 715/736 |
| 2011/0270913 | A1* | 11/2011 | Jarnikov | H04N 21/23439 709/203 |
| 2012/0004960 | A1* | 1/2012 | Ma | G06Q 30/0241 705/14.4 |
| 2012/0005364 | A1* | 1/2012 | Ma | G06Q 30/0241 709/231 |
| 2012/0005365 | A1* | 1/2012 | Ma | G06Q 30/0241 709/231 |
| 2013/0013803 | A1* | 1/2013 | Bichot | H04L 65/1046 709/231 |
| 2013/0103849 | A1* | 4/2013 | Mao | H04N 21/8456 709/231 |
| 2013/0326024 | A1* | 12/2013 | Chen | H04L 65/4084 709/219 |
| 2014/0095943 | A1* | 4/2014 | Kohlenberg | H04L 29/08 714/47.3 |
| 2014/0181266 | A1* | 6/2014 | Joch | H04L 65/605 709/219 |
| 2014/0317234 | A1* | 10/2014 | Mueller | H04L 47/10 709/217 |
| 2015/0256581 | A1* | 9/2015 | Kolhi | H04L 65/602 709/219 |
| 2016/0006817 | A1* | 1/2016 | Mitic | H04L 65/4076 709/232 |
| 2016/0080456 | A1* | 3/2016 | Ma | G06Q 30/0241 709/231 |
| 2016/0345240 | A1* | 11/2016 | Gibbon | H04L 67/325 |

OTHER PUBLICATIONS

International Search Report for PCT/EP2015/050481 dated Mar. 23, 2015.
F. Metzger, "A Performance Evaluation Framework for Video Streaming," Packet Video Workshop (PV), 2012 19$^{th}$ International, IEEE, May 10, 2012, pp. 19-24.

* cited by examiner

PLAYBACK CONTROL DEVICE AND METHOD FOR STREAMING MEDIA CONTENT

FIELD OF INVENTION

The field of the invention relates to controlling playback of streaming media content. Particular embodiments relate to a client device for controlling playback of media content that is streamed through a network to the client device, a method for controlling playback of media content that is streamed through a network to a client device, a prediction module for use with a client device for controlling playback of media content that is streamed through a network to the client device, and a computer program for performing the method.

BACKGROUND

HAS (HTTP (HyperText Transfer Protocol) Adaptive Streaming) has become widely adopted as the main video streaming technology in the past years due to its firewall transparency and bit rate adaptation capability. It is able to adjust the streaming bit rate based on the network condition in order to avoid any playback interruption. However, when the network condition becomes bad, current HAS algorithms are not ideal to provide the best QoE (Quality of Experience) to end-users. For instance, when the network bandwidth is lower than the lowest available encoding quality, the client device will suffer freezes. If the network condition stays bad for a longer time, the end-user will experience a periodical "short play-short pause-short play-short pause" behavior, which is detrimental to QoE.

SUMMARY

Embodiments of the invention aim to improve the user QoE for playback of streaming media content, especially when network conditions are bad.

According to a first aspect of the invention there is provided a client device for controlling playback of media content that is streamed through a network to the client device. The client device comprises an obtaining module, which is configured for obtaining network prediction information representing network conditions of the network predicted for a future prediction time period. The client device further comprises a playback control module configured for controlling playback of said content based on the network prediction information.

Embodiments are based inter alia on the inventive insight that predicting network conditions of a network for a future prediction time period allows a client device to better control the way it plays back media content, since it can take foreseeable future higher or lower available bandwidths into account, e.g. when deciding whether or not to play back media content.

According to a preferred embodiment the client device is suitable for controlling playback of media content that is available at a provider in a plurality of encoding qualities. The encoding qualities comprise at least a lowest encoding quality and a highest encoding quality. The media content is adaptively streamed to the client device upon request. The playback control module is configured for determining an encoding quality to be requested based on the obtained network prediction information. It is further configured for requesting the determined encoding quality from said provider.

In this manner, it is possible to not only control the actual playback of received content, but also the encoding quality of content that will be received, e.g. by requesting a lower encoding quality or a higher encoding quality than when using typical adaptive streaming techniques, such as HAS, in order to better satisfy a user's QoE.

According to an embodiment the client device comprises a buffer for storing received content. Said buffer may be associated with a static minimum playback time period representing a playback time of a buffer filled with content with the highest encoding quality. Preferably, the prediction time period extends further into the future than the static minimum playback time period. According to another embodiment, said buffer may be associated with a static maximum playback time period representing a playback time of a buffer filled with content with the lowest encoding quality. More preferably, the prediction time period then extends further into the future than the static maximum playback time period. In this way it can be guaranteed that the prediction time period will cover enough time to improve the user QoE for playback.

Note that the terms minimum and maximum playback time period as defined above do not necessarily refer to the actual dynamic playback time period of the content in the buffer. In a further developed embodiment, a dynamic playback time period could be considered that more accurately represents such an actual playback time of a buffer. In this way, a prediction time period could be determined more effectively to extend further into the future than the dynamic playback time period. The skilled person will appreciate the trade-offs presented here, and will understand that hybrid schemes based on combinations of static and dynamic playback time periods may also be used depending on the circumstances.

According to another embodiment the playback control module is configured for determining at least one of pausing, starting and notifying of media playback based on the obtained network prediction information.

According to yet another embodiment the obtaining module is configured for performing the step of obtaining network prediction information periodically, preferably with a period which is less than the prediction time period.

In this manner, it is possible to predict future network conditions sufficiently often to prevent the occurrence of time periods that have not been predicted.

According to a possible embodiment the obtaining module is configured for obtaining context information representing a client device context. Said context information may comprise device characteristics of the client device and/or information on user interaction with the client device. Device characteristics may include characteristics of the physical device such as a screen resolution, a window size, a type of network connection. User interaction may include user-given commands such as pausing, skipping, forwarding, rewinding. The obtaining module may also be configured for obtaining preference pattern information representing user behavior. Said preference pattern information may comprise machine-learned user behavior patterns and/or user-set preferences. The machine-learned user behavior patterns may include rules that have been learned about typical user behavior given a situation, using e.g. reinforcement learning algorithms. The user-set preferences may include preferences that the user has manually defined, e.g. through the use of a GUI preference menu. The machine-learning algorithms may take the user-set preferences into account when learning about the user. The obtaining module may also be configured for obtaining session monitoring information. Said session monitoring information may include arrival times of received content and/or download speed information for received content. The arrival times of the received content may be used to determine a round-trip time (RTT). Given the size of the received content, it is then possible to calculate a download speed for the received content. The playback control module may be configured for controlling playback based on the obtained context information, the obtained preference pattern information and/or the obtained session monitoring information.

In this manner, a more refined decision can be made by the playback control module, since the other obtained information besides the network prediction information may allow the playback control window to make decisions to improve the user's QoE (such as freezing playback to keep downloading a higher encoding quality while e.g. showing a 'loading' indication) even though predicted network conditions might allow for further playback at a lower encoding quality, if the user has indicated and/or has been found to prefer waiting for higher encoding qualities.

According to yet another aspect of the invention, there is provided a method for controlling playback of media content that is streamed through a network to a client device. The method comprises at the client device the step of obtaining network prediction information representing network conditions of the network predicted for a future prediction time period. The method also comprises the step of controlling playback of said content based on the network prediction information.

Embodiments are based inter alia on the inventive insight that predicting network conditions of a network for a future prediction time period allows a client device to better control the way it plays back media content, since it can take foreseeable future higher or lower available bandwidths into account, e.g. when deciding whether or not to play back media content.

According to a preferred embodiment the method is suitable for controlling playback of media content that is available in a plurality of encoding qualities. Said encoding qualities comprise at least a lowest encoding quality and a highest encoding quality at a provider. The media content is adaptively streamed to the client device upon request. The method step of controlling playback may further comprise determining an encoding quality to be requested based on the obtained network prediction information and requesting the determined encoding quality from said provider. In this manner, it is possible to not only control the actual playback of received content, but also the encoding quality of content that will be received, e.g. by requesting a lower encoding quality or a higher encoding quality than when using typical adaptive streaming techniques, such as HAS, in order to better satisfy a user's QoE.

According to an embodiment the method comprises the step of storing received content in a buffer at the client device. Said buffer may be associated with a static minimum playback time period representing a playback time of a buffer filled with content with the highest encoding quality. Preferably the prediction time period extends further into the future than the static minimum playback time period. According to another embodiment, said buffer may be associated with a static maximum playback time period representing a playback time of a buffer filled with content with the lowest encoding quality. More preferably, the prediction time period then extends further into the future than the static maximum playback time period. In this way it can be guaranteed that the prediction time period will cover enough time to improve the user QoE for playback.

Note that the terms minimum and maximum playback time period as defined above do not necessarily refer to the actual dynamic playback time period of the content in the buffer. In a further developed embodiment, a dynamic playback time period could be considered that more accurately represents such an actual playback time of a buffer. In this way, a prediction time period could be determined more effectively to extend further into the future than the dynamic playback time period. The skilled person will appreciate the trade-offs presented here, and will understand that hybrid schemes based on combinations of static and dynamic playback time periods may also be used depending on the circumstances.

According to a preferred embodiment the method step of controlling playback comprises determining at least one of pausing, starting and notifying of media playback based on the obtained network prediction information.

According to a further developed embodiment the method may comprise obtaining context information representing a client device context. Said context information may include device characteristics of the client device and/or information on user interaction with the client device.

The method may also comprise obtaining preference pattern information representing user behavior. Said preference pattern information may include machine-learned behavior patterns and/or user-set preferences. The method may further also comprise obtaining session monitoring information. Said session monitoring information may include arrival times of received content and/or download speed information for received content. Further, the step of controlling playback may be based on the obtained context information or the obtained preference pattern information or the obtained session monitoring information or any combination thereof.

According to a preferred embodiment the step of obtaining network prediction information is performed periodically, preferably with a period which is less than the prediction time period.

In this manner, it is possible to better control playback of media content using the obtained network prediction information, since by periodically obtaining network prediction information sufficiently often (i.e. with a period which is less than the prediction time period) it is possible to have network prediction information available continuously or essentially continuously.

According to yet another aspect of the invention, there is provided a prediction module for use with a client device for controlling playback of media content that is streamed through a network to the client device. The prediction module comprises a monitoring unit configured for monitoring current network conditions. The prediction module also comprises a calculation unit configured for calculating predicted network conditions for the network for a future prediction time period. The prediction module further also comprises a providing unit configured for providing network prediction information based on said predicted network conditions to the client device. The providing may take the form of transmitting the network prediction information through one or more communication links, or it may take the form of simply allowing a read operation of a memory location by the client device if they share said memory location, e.g. by being directly connected.

Possible prediction techniques may comprise the use of collected statistics on network conditions. Based on such historical information the prediction module may calculate probabilistic indications of network conditions for a future prediction time period, using statistical modeling techniques, such as Markov chains, etc. The skilled person will appreciate that the smaller a prediction time period is, the more accurate (and/or easily) calculated predictions for said prediction time period will be, and will understand the trade-offs that are involved when choosing short or long time periods, statically or dynamically.

Depending on its location in the network (e.g. near to the client device (or even comprised therein), or further away from the client device and closer to a media provider in the network), the prediction module may advantageously monitor network conditions from within the network.

Optionally, the prediction module may keep track of other concurrent or historical sessions, even those of other users (of course given privacy considerations), as well as available maintenance information from a network provider, in order to more accurately predict future network conditions of the network.

According to a preferred embodiment the prediction module comprises a machine-learning unit configured for automatically learning network behavior patterns. The calculation unit may then be configured for calculating the predicted network conditions using the machine-learned network behavior patterns.

The machine-learning unit may in this manner automatically and continuously (or intermittently) learn about network behavior patterns using typical unsupervised reinforcement learning techniques, such as neural networks, etc.

According to yet another aspect of the invention, there is provided a system for controlling playback of media content that is streamed through a network comprising a client device according to any of the above described client devices. The system also comprises a prediction module according to the above described prediction module.

According to yet another aspect of the invention, there is provided a computer program comprising computer-executable instructions to perform the method, when the program is run on a computer, of any one of the above described methods.

For the sake of completeness, the meaning of the wording "A and/or B" is defined to be equivalent to that of "A or B or both".

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
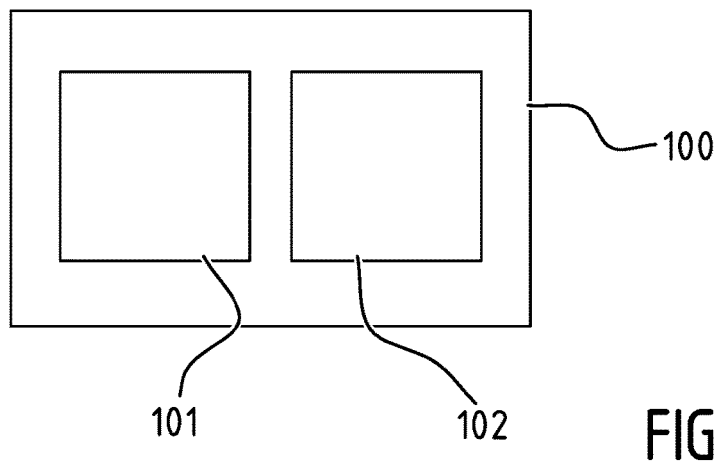
FIG. 1 illustrates schematically an embodiment of a client device according to the present invention.

FIG. 1 illustrates schematically an embodiment of a client device 100 according to the present invention, for controlling playback of media content that is streamed through a network (not shown) to the client device. The client device comprises an obtaining module 101 and a playback control module 102. The obtaining module 101 is configured for obtaining network prediction information representing network conditions of the network predicted for a future prediction time period. The playback control module 102 is configured for controlling playback of said content based on the network prediction information.

When a client device encounters a decrease in network bandwidth, it is useful to know how long this situation will last. For instance, if the network bandwidth downgrade is caused by a cable-cut on a physical link of the network, due to repair of the physical link the situation will not get much better within, say, half an hour. In that case a pause or freeze is typically a better choice than playing back video content at best effort. During the pause/freeze, the client device should also enlarge its buffering to accept more video segments. To some extent, it can switch itself to a temporal "progressive downloading" mode. When the network condition gets better, it can switch back to a typical adaptive streaming mode.

Figure 2:
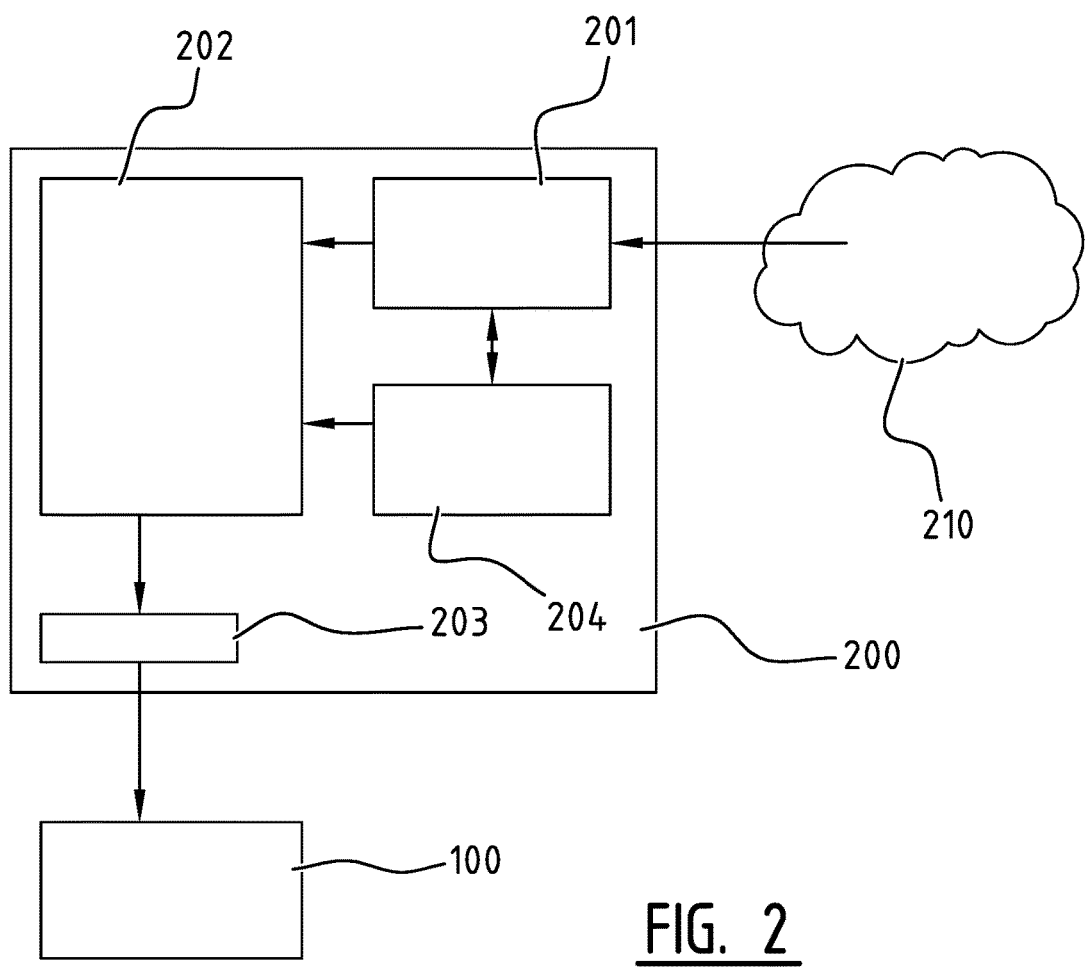
FIG. 2 illustrates schematically an embodiment of a prediction module according to the present invention.

FIG. 2 illustrates schematically an embodiment of a prediction module 200 according to the present invention, for use with a client device 100 for controlling playback of media content that is streamed through a network 210 to the client device. The prediction module 200 comprises a monitoring unit 201, a calculation unit 202 and a providing unit 203. The exemplary embodiment shown also comprises a machine-learning unit 204.

The monitoring unit 201 is configured for monitoring current network conditions. The monitoring unit 201 will advantageously have knowledge of the network's topology and be aware of traffic on the network, including information about concurrent sessions, (overall) network load, network maintenance information, etc.

The calculation unit 202 is configured for calculating predicted network conditions for the network for a future prediction time period. Possible prediction techniques may comprise the use of collected statistics on network conditions. Based on such historical information the prediction module 200 may calculate probabilistic indications of network conditions for a future prediction time period, using statistical modeling techniques, such as Markov chains, etc. The skilled person will appreciate that the smaller a prediction time period is, the more accurate (and/or easily) calculated predictions for said prediction time period will be, and will understand the trade-offs that are involved when choosing short or long time periods, statically or dynamically.

The providing unit 203 is configured for providing network prediction information based on said predicted network conditions to the client device 100. The providing may take the form of transmitting the network prediction information through one or more communication links, or it may take the form of simply allowing a read operation of a memory location by the client device 100 if they share said memory location, e.g. by being directly connected.

The machine-learning unit 204 that is shown in this exemplary embodiment is configured for automatically learning network behavior patterns, using historical information to learn about typical network behavior patterns. The machine-learning unit 204 may in this manner automatically and continuously (or intermittently) learn about network behavior patterns using typical unsupervised reinforcement learning techniques, such as neural networks, etc. The learned patterns can be taken into consideration by the calculation unit 202 when calculating predicted network conditions.

Figure 3:
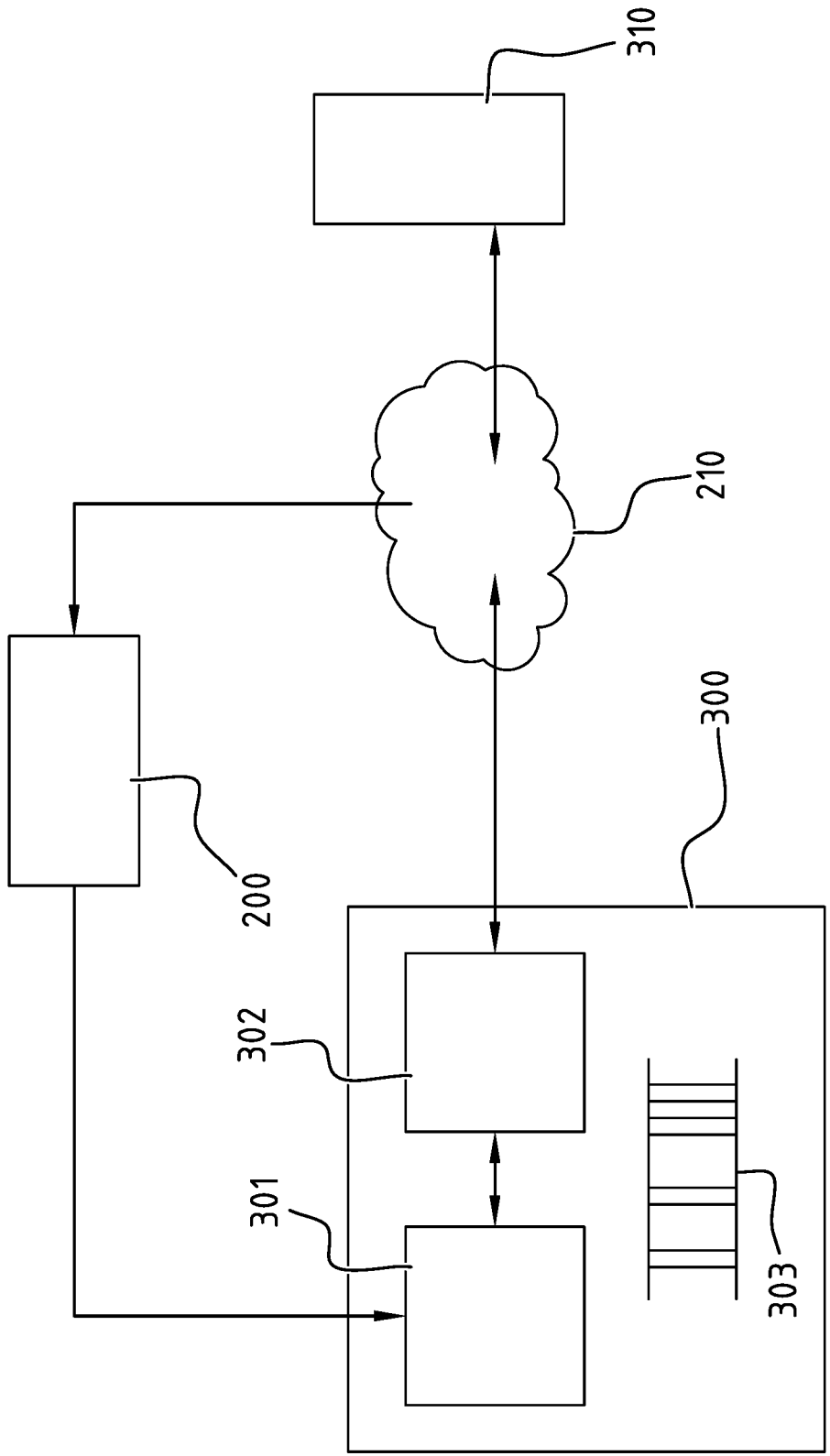
FIG. 3 illustrates schematically an embodiment of a system according to the present invention.

FIG. 3 illustrates schematically an embodiment of a system according to the present invention. The system comprises a client device 300 for controlling playback of media content that is available at a provider 310 in a plurality of encoding qualities comprising at least a lowest encoding quality and a highest encoding quality and that is adaptively streamed (as received content) to the client device upon request. The client device comprises an obtaining module 301 and a playback control module 302.

The obtaining module 301 is configured for obtaining network prediction information, in a similar way as described above. The obtaining module 301 is also configured for obtaining context information, preference pattern information, and session monitoring information.

The context information represents the client device's context, and may include device characteristics of the client device, such as physical device characteristics (e.g. device type, monitor size, screen resolution, type of network connection, etc.). The context information may also include information on user interaction with the client device, such as user-input playback interactions (e.g. pause, fast-forward, rewind, skip, minimize, changing window size, full-screen toggle, etc.). For instance if the client device's screen resolution is at 800×600, it makes no sense for a client device to ask a High Definition quality video segment. If a user pauses playback for a relatively long time, it will be better to download high quality video segments instead of low quality video segments, even under a low bandwidth condition.

The preference pattern information represents user behavior, and may include machine-learned behavior patters and/or user-set preferences. Preference patterns could relate to but are not limited to the following:
 the minimum request video quality
 allow freeze or not
 prefer flat quality than fluctuation
 the maximum freeze time
 the maximum number of freezes
 the maximum latency (live streaming case)
 . . .

The client device can use the user's preferences to make the right decisions. Some options can be manually set by the user himself (e.g. through a GUI allowing users to create, update and delete preferences). Some options can be acquired based on historical statistics of user's behavior, using e.g. machine-learning based on the client's playback behavior. Specific parameters may include: current watching channel, starting time, stop time, context information such as device characteristics (e.g. screen resolution, etc.) and playback QoE (e.g. factors like freezing, quality fluctuation, level of qualities, etc.), favorite channels (e.g. detecting the user's favorite channel by calculating the average viewing time per channel per day). For instance, if a user often stops watching a movie when the quality of the video gets downgraded to or below 500 kbps, this indicates the minimum acceptable video quality for this user on this computer is at least 500 kbps. Suppose there is a video encoded in five different video qualities. The lowest quality is 300 kbps. When the network bandwidth somehow stays at 350 kbps, it is possible for existing prior art client devices to get the lowest quality video segments. However, if the client device takes user's preference into account, it might freeze in this case, in order to improve the user's QoE.

The user behavior patterns can be considered an ontology database storing rules reflecting the user's decision when encountering a specific situation. Examples of such rules are:

If the bandwidth is lower than the lowest quality of the video segment, then the client device pauses the playback until the buffer is fully filled.

If the current screen is a 52 inch HDTV, the client should request video segments with at least 2 Mbps.

If the current screen is a 7 inch iPhone, the client should not request video segments with quality above 1 Mbps.

Rules can be generated based on input to produce rules reflecting user's choice. For instance, channel I is the favorite channel for the user. He watches it every day almost for 2 hours, typically from 19:00-21:00. Assume that for the past several weeks, it is detected that the user watches channel I for less than 2 hours and most of time, he stops watching within 30 seconds after the video playback experiences freezing for more than 10 seconds. With enough data, it can be concluded that the user probably cannot stand freezing longer than 10 seconds, even for his favorite channel. Although such conclusions cannot guarantee accuracy, the more data is analyzed, the better accuracy will be.

The session monitoring information may comprise specific information related to the client device's session. The session monitoring information comprises at least arrival times of received content and/or download speed information for the received content (which can also be calculated based on the arrival times and on the size of the received content). Information like the session monitoring information typically allows a streaming client device to gauge the available bandwidth and adaptively adjust its requests correspondingly.

The skilled person will understand that although this specific embodiment is described using network prediction information, context information, preference pattern information and session monitoring information, other embodiments may use other combinations of these types of information, in accordance with the claimed subject-matter. Moreover, the skilled person will appreciate that the matter of how to obtain said types of information and wherefrom is evident from their respective natures (i.e. some of the context information can for instance be obtained from a user interaction monitoring unit or the like, etc.).

The playback control module 302 is configured for controlling playback of said content based on the network prediction information, the context information, the preference pattern information, and/or the session monitoring information. The playback control module 302 is also configured for determining an encoding quality to be requested based on the obtained information (both the network prediction information and the other listed information, i.e. context information, preference pattern information and/or session monitoring information), and for requesting the determined encoding quality from the provider.

The client device also comprises a buffer 303 for storing received content to be played back to the user. The buffer is shown containing chunks of content with different encoding qualities (graphically represented as bigger and smaller chunks). As discussed above, the buffer may be associated with a static minimum playback time period representing a playback time of a buffer filled with content with the highest encoding quality and with a static maximum playback time period representing a playback time of a buffer associated with content with the highest encoding quality. Preferably, the prediction time period extends further into the future than the static minimum playback time period; more preferably further than the static maximum playback time period.

Figure 4:
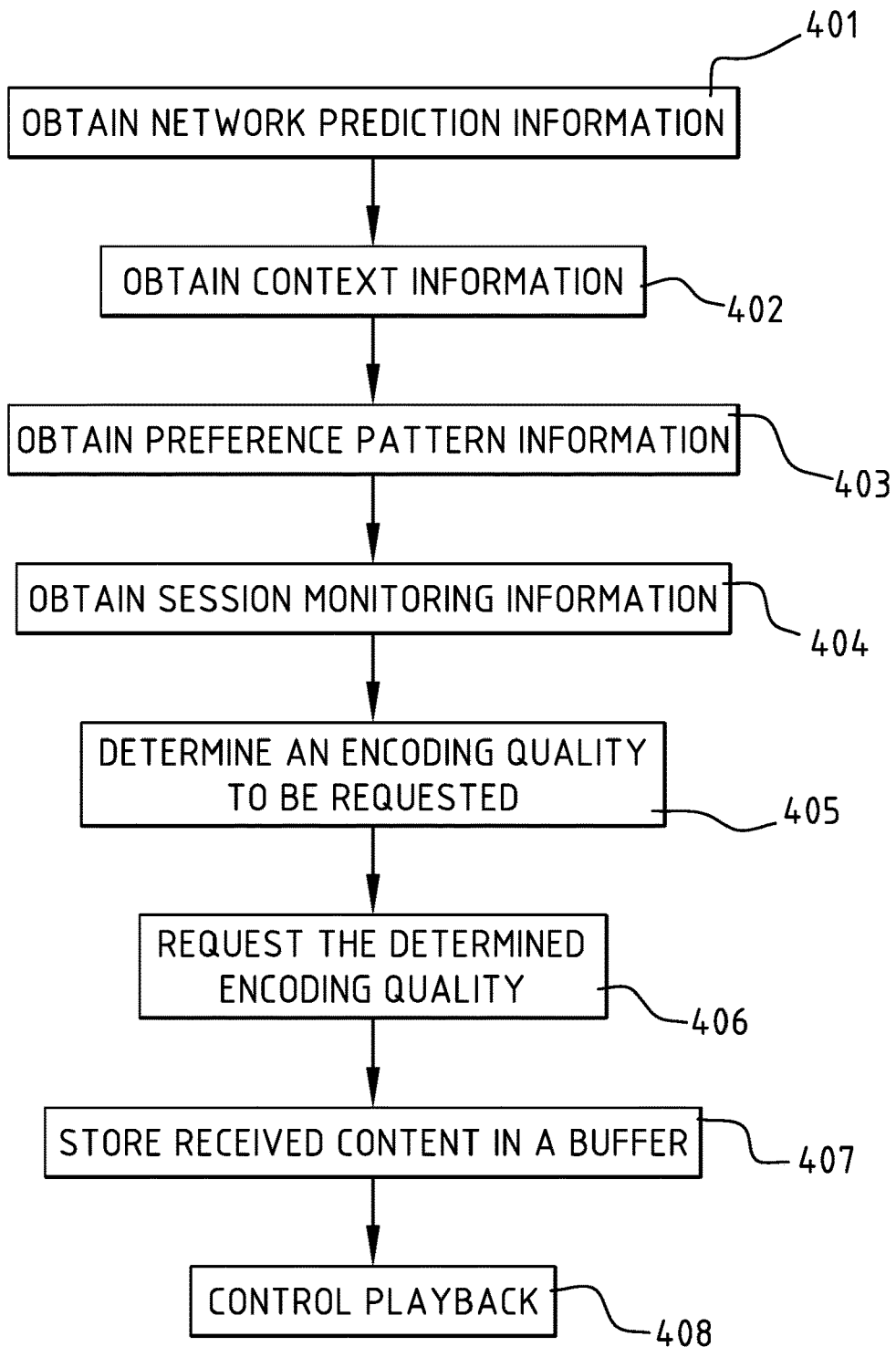
FIG. 4 illustrates schematically an embodiment of a method according to the present invention.

FIG. 4 illustrates schematically an embodiment of a method according to the present invention. The method comprises the steps of obtaining network prediction information 401, obtaining context information 402, obtaining preference pattern information 403, and obtaining session monitoring information 404. The method also comprises the steps of determining an encoding quality to be requested 405, based on the obtained information and requesting the determined encoding quality 406. The method further also comprises storing received content in a buffer 407 and controlling playback 408, based on the obtained information.

The skilled person will appreciate that although the method steps described in this exemplary embodiment have been drawn and discussed in a certain order and without omitting any, it is possible to skip certain method steps or to reorder them, in accordance with the claimed subject-matter.

We list a few scenarios to illustrate that embodiments of the invention enrich typical prior art HAS approaches to offer much better QoE, especially when the network condition gets bad. Assume a user is watching a video which contains five video quality levels: 300 kbps, 800 kbps, 1.2 Mbps, 2.4 Mbps and 3.6 Mpbs.

1. A user is watching the movie on a HD screen/TV. When the network bandwidth turns to 900 kbps, the existing client device will lower the video quality to 800 kbps or even 300 kbps. With a client device embodiment, the user may be able to set the minimum acceptable quality to 1.2 Mbps. In this case, the client may freeze the playback and may continue to download high quality video segments.

2. A user is watching the movie on a computer. When the network bandwidth becomes lower than 300 kbps, the existing client device will enter into a continuous "freeze-play" loop with very short intervals. According to an embodiment, the client device may execute the following steps: a) pause the movie, b) communicate with the prediction module to see how long it takes to recover the bandwidth, c) in case of long duration of this low bandwidth, the client device might pause a bit longer time and provide this feedback to the user in the meantime, d) in case of short duration, the client device might start to play the movie sooner.

3. From the user's historical behavior, the client device may learn that when a video's quality drops below 800 kbps, the user tends to pause the video. Then certain client device embodiments may set the minimum quality level to 800 kbps.

4. A user is watching the movie on a computer. Due to the network bandwidth limitation, the user is for the moment watching the video at 800 kbps. He decides to pause the video playback. The existing client devices will continue buffering at 800 kbps until it reaches steady state. Certain client device embodiments may use the pause interval to make more intelligent decisions. For instance, after filling up its buffer, if the user are still pausing this video, a client device embodiment might consider to increase the quality of downloaded video segments. In case of SVC (Scalable Video Coding); it may ask more enhancement layers during the pausing time. In case of AVC (Advanced Video Coding), it could simply replace already downloaded segments with higher quality segments.

5. A client device embodiment may be informed upfront by the prediction module that because of maintenance activities in the network, the sustainable bandwidth will drop within 10 minutes from 3 Mbps to 1 Mps and remain likes this for 5 minutes. The client device could use this information to increase in the remaining period of high bandwidth its buffer from e.g. 30 seconds to 3 minutes. If necessary, this could be done by selecting a lower video quality level. Because of the increased buffer, the client will be able to maintain a higher quality during the 10 minutes of reduced bandwidth.

Whilst the principles of the invention have been set out above in connection with specific embodiments, it is to be understood that this description is merely made by way of example and not as a limitation of the scope of protection which is determined by the appended claims.

The invention claimed is:

1. A client device for controlling playback of media content that is streamed through a network to the client device, the client device comprising:
   at least one processor; and
   at least one memory device including computer program code, the at least one memory device and the computer program code configured to, with the at least one processor, cause the client device at least to perform
      obtaining network prediction information representing network conditions of the network predicted for a future prediction time period;
      storing received media content in a buffer memory, said buffer memory being associated with a static maximum playback time period representing a playback time of a buffer filled with content with a lowest available encoding quality, wherein the future prediction time period extends further into the future than the static maximum playback time period, and wherein the media content is available from a provider in a plurality of encoding qualities comprising at least said lowest encoding quality and a highest encoding quality; and
      controlling playback of said media content based on the network prediction information.

2. The client device of claim 1, wherein the at least one memory device and the computer program code are further configured to, with the at least one processor, cause the client device at least to further perform:
   determining an encoding quality to be requested based on the obtained network prediction information; and for
   requesting the determined encoding quality from said provider.

3. The client device of claim 1 wherein the at least one memory device and the computer program code are further configured to, with the at least one processor, cause the client device at least to further perform determining at least one of pausing, starting and notifying of media playback based on the obtained network prediction information.

4. The client device of claim 1, wherein the at least one memory device and the computer program code are further configured to, with the at least one processor, cause the client device at least to further perform the obtaining network prediction information periodically with a period which is less than the future prediction time period.

5. The client device of claim 1, wherein:
   the at least one memory device and the computer program code are further configured to, with the at least one processor, cause the client device at least to further perform at least one of:
      obtaining context information representing a client device context, said context information comprising at least one of:
         device characteristics of the client device; or
         information on user interaction with the client device; or
      obtaining preference pattern information representing user behavior, said preference pattern information comprising at least one of:
         machine-learned user behavior patterns; or
         user-set preferences; or obtaining session monitoring information comprising at least one of:
    arrival times of received content; or
    download speed information for received content;
and further perform
    controlling playback based on at least one of:
        the obtained context information; or
        the obtained preference pattern information; or
        the obtained session monitoring information.

6. A method for controlling playback of media content that is streamed through a network to a client device, the method comprising at the client device:
    obtaining network prediction information representing network conditions of the network predicted for a future prediction time period;
    buffering received media content in a buffer associated with a static maximum playback time period representing a playback time of the buffer filled with content with a lowest available encoding quality, wherein the future prediction time period extends further into the future than the static maximum playback time period and wherein the media content is available in a plurality of encoding qualities comprising at least said lowest encoding quality and a highest encoding quality; and
    controlling playback of said media content based on the network prediction information.

7. The method of claim 6 wherein the controlling playback comprises:
    determining an encoding quality to be requested based on the obtained network prediction information; and
    requesting the determined encoding quality from said provider.

8. The method of claim 6, wherein the controlling playback comprises:
    determining at least one of pausing, starting and notifying of media playback based on the obtained network prediction information.

9. The method of claim 6, comprising:
    obtaining context information representing a client device context, said context information comprising at least one of:
        device characteristics of the client device; or
        information on user interaction with the client device; or
    obtaining preference pattern information representing user behavior, said preference pattern information comprising at least one of:
        machine-learned behavior patterns; or
        user-set preferences; or
    obtaining session monitoring information comprising at least one of:
        arrival times of received content; or
        download speed information for received content;
and wherein the controlling playback is further based on at least one of:
    the obtained context information; or
    the obtained preference pattern information; or
    the obtained session monitoring information.

10. The method of claim 6, wherein:
    the obtaining network prediction information is performed periodically with a period which is less than the future prediction time period.

11. A prediction module for use with a client device for controlling playback of media content that is streamed through a network to the client device, comprising:
    at least one processor; and
    at least one memory device including computer program code, the at least one memory device and the computer program code configured to, with the at least one processor, cause the prediction module to at least perform:
        monitoring current network conditions;
        calculating predicted network conditions for the network for a future prediction time period; and
        providing network prediction information based on said predicted network conditions to the client device, wherein the future prediction time period extends further into the future than a static maximum playback time period which represents a playback time of a buffer of the client device filled with media content with a lowest encoding quality available at a provider.

12. A system for controlling playback of media content that is streamed through a network comprising a client device according to claim 1, and a prediction module comprising:
    at least one processor; and
    at least one memory device including computer program code, the at least one memory device and the computer program code configured to, with the at least one processor, cause the prediction module to at least perform:
        monitoring current network conditions;
        calculating predicted network conditions for the network for a future prediction time period; and
        providing network prediction information based on said predicted network conditions to the client device, wherein the future prediction time period extends further into the future than a static maximum playback time period which represents a playback time of a buffer of the client device filled with media content with a lowest encoding quality available at a provider.

13. A non-transitory computer readable media carrying computer program instructions for causing an associated client device to perform the method of claim 6.

* * * * *